United States Patent [19]

Howard

[11] Patent Number: 4,672,215

[45] Date of Patent: Jun. 9, 1987

[54] HAND HELD LASER BAR CODE READER WITH SAFETY SHUTOFF RESPONSIVE TO HOUSING MOTION DETECTOR

[75] Inventor: P. Guy Howard, Junction City, Oreg.

[73] Assignee: Spectra-Physics, Inc., San Jose, Calif.

[21] Appl. No.: 834,189

[22] Filed: Feb. 27, 1986

[51] Int. Cl.⁴ .............................................. G06K 7/10
[52] U.S. Cl. ................... 250/566; 235/472; 219/121 LB
[58] Field of Search ................ 235/472; 250/566, 567, 250/568, 569, 570; 382/59; 219/121 LB

[56] References Cited

U.S. PATENT DOCUMENTS

| 4,387,297 | 6/1983 | Swartz et al. | 235/472 |
| 4,496,831 | 1/1985 | Swartz et al. | 235/472 |
| 4,575,625 | 3/1986 | Knowles | 235/472 |

*Primary Examiner*—David C. Nelms
*Assistant Examiner*—William L. Oen
*Attorney, Agent, or Firm*—Donald C. Feix; T. M. Freiburger; Paul Davis

[57] ABSTRACT

A hand held laser bar code reader includes a motion sensor and associated circuitry to disable energization of the laser unless the bar code reader has just undergone some degree of motion. This safety feature avoids the possibility of the bar code reader's being held motionless for a long enough time to cause retinal damage to a human eye.

5 Claims, 3 Drawing Figures

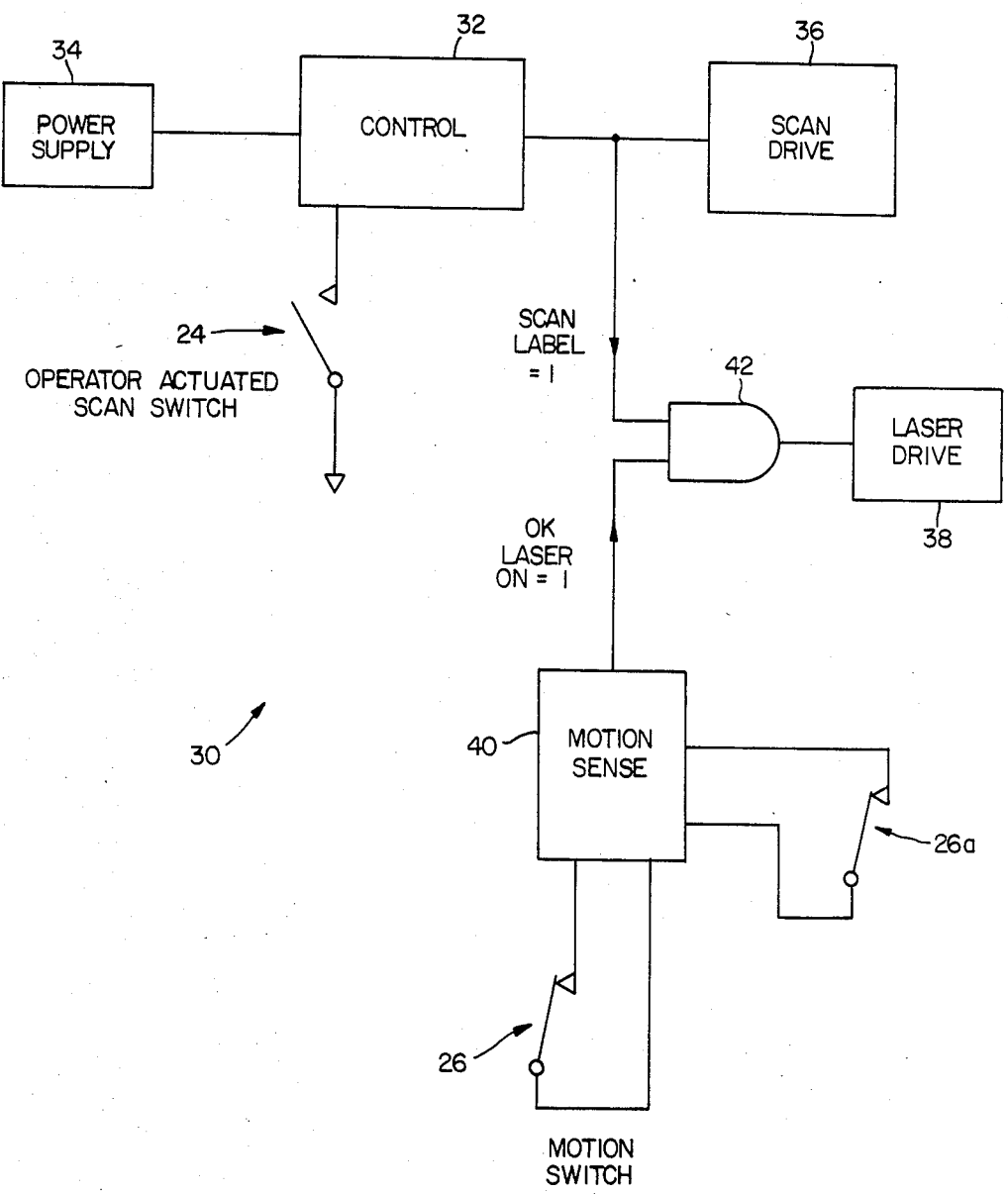

HAND HELD LASER BAR CODE READER WITH SAFETY SHUTOFF RESPONSIVE TO HOUSING MOTION DETECTOR

BACKGROUND OF THE INVENTION

The invention relates to a hand-held laser bar code reader, or scanner, and to the meeting of safety requirements in regard to such laser devices.

Scanners for reading bar codes have been increasingly used for commercial and industrial purposes. In addition to the well-known use in supermarkets for reading the labels on goods they are also used in warehouses for inventory and identification of goods. However, in warehouse usage there is often a considerable distance to the goods. For this purpose there is in general a need for hand-held scanners that can read over a long distance for making the work of the user more efficient and to avoid the need for climbing up to goods stored in high places.

At the same time, such scanners must satisfy safety requirements, such as those promulgated by regulations such as 21 CFR §1040 in the United States and I.E.C. Pub. 825, of the International Electrotechnical Commission. These requirements specify that a laser scanner (depending on use) must be of sufficiently low power that its beam will not injure the human eye if aimed directly into the eye for a prescribed period of time (often 1000 seconds, or about 16 minutes.)

It is an object of the present invention to produce a relatively high powered hand-held laser bar code reader, suitable for efficient use in warehouses and like places, which includes a safety device to prevent the possibility of beam exposure to the human eye for dangerous periods.

SUMMARY OF THE INVENTION

This is accomplished in accordance with the invention by including a motion sensor in the hand-held scanner. The small motion sensor can be integrated in the body of the hand-held reader or it can be fixed on the outside of the device.

The motion sensor and associated components and circuitry embody the safety feature of the hand-held scanner, and are effective to shut off or disable the scanner automatically if the scanner remains stationary for a preselected period of time. To be activated, the scanner has to have just moved or be in the process of at least minute movement. The time period during which the scanner can be stationary and still energized will vary with application. It can be adapted to different beam powers of the scanner, or different beam powers for different scanners. The higher the scanner power, the sooner the motion sensor will disable the laser in a stationary period. Since a relatively long period of exposure is required to cause eye damage, the stationary time period can be set at five seconds, ten seconds or fifteen seconds, for example, still representing a conservative safety factor.

Motion sensor devices and circuitry of the general type suitable for use in the present invention have previously been used in some household flatirons. The object there was to prevent the danger of fire or other damage to surrounding objects or to the flatiron itself, due to the flatiron's being left on and unattended for prolonged periods. In the present invention the object is different. It is based on a shorter period of time, and directed to making it impossible to cause eye damage with a hand-held laser scanner, due to the inherent nature of the human body and hand to be in motion to at least some minute degree.

The scanner can only cause eye damage if the beam is directed against the retina (or the scanning beam scanned repeatedly back and forth across the eye, intermittently striking the retina) for a considerable period of time. In practical effect, this requires that both the eye and the scanner device be motionless for that prolonged period of time. For the scanner and the person's eye to be both in motion but synchronous motion with the beam continually fixed on the eye is a practical impossibility.

Therefore, it is a primary object of the invention to prevent the possibility of eye damage from a hand-held laser bar code reader by limiting possible eye exposure, therefore enabling the laser beam to be more powerful in accordance with need.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 3 is a schematic circuit diagram showing circuitry which can be used in accordance with the principles of the invention.

DESCRIPTION OF A PREFERRED EMBODIMENT

Figure 1:
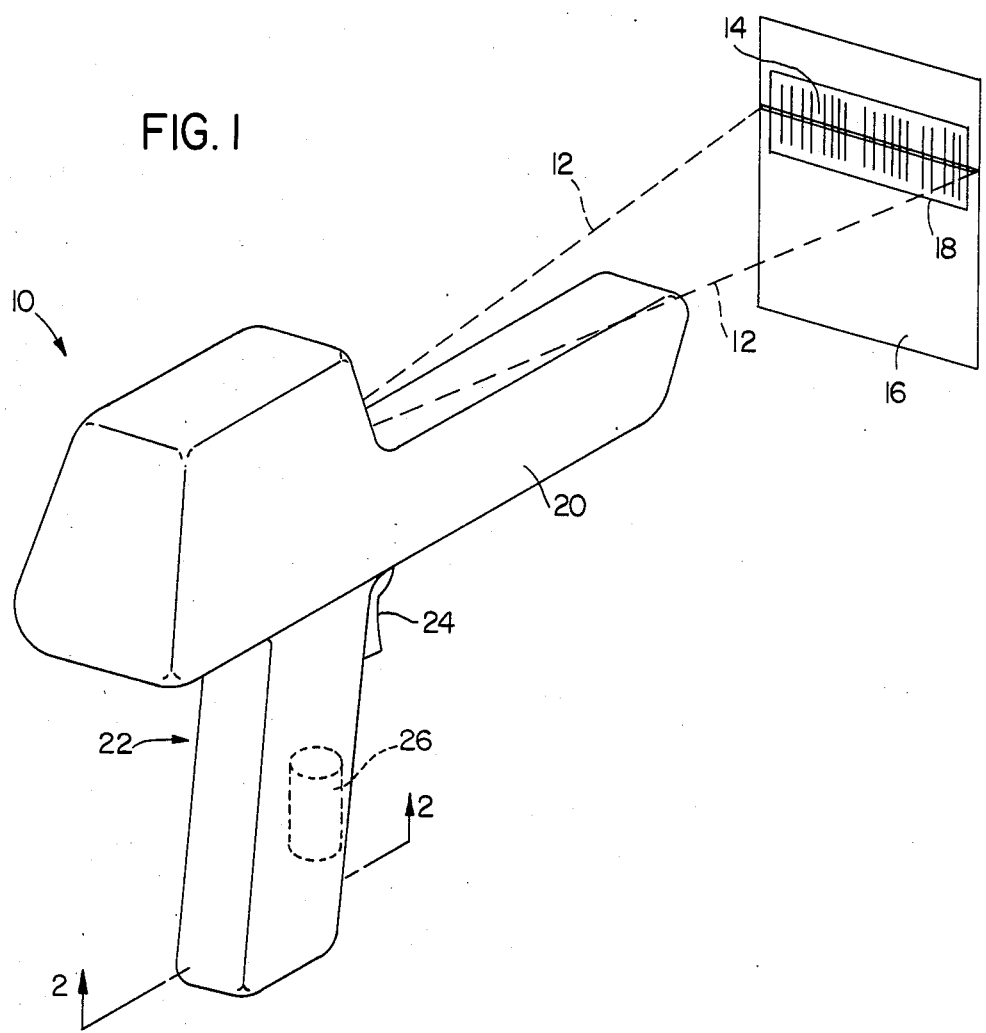
FIG. 1 is a perspective view showing a hand-held laser bar code reader in accordance with the invention, indicating the device reading a bar code.

In the drawings, FIG. 1 shows a conventional hand-held laser scanner 10 of the type generally used as a non-contacting reader of bar codes. The bar code reader 10 is shown scanning a laser beam 12 (dashed lines) in a reciprocating projected pattern to form a scan line 14 on an object surface 16.

The scanner 10 is shown projecting the scan line 14 across a bar code 18 on the surface 16. The bar code 18 may be of conventional format comprising alternate reflecting and nonreflecting lines of differing widths. The laser scan line 14 is shown crossing the bars of the bar code transversely. Although a single scan line 14 is shown formed by the laser scanner 10, it should be understood that the scanner 10 can be of the type which projects a raster pattern or other suitable pattern comprising more than one scan line.

The scanner 10 may comprise a gun-shaped housing 20 of conventional configuration, including a handle portion 22 and a spring-loaded trigger switch 24.

Figure 2:
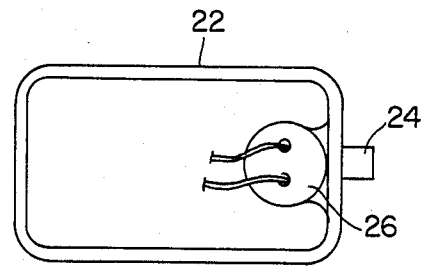
FIG. 2 is a sectional view through the bar code reader, as seen along the line 2—2 in FIG. 1, showing the motion sensor installed internally in the housing of the device.

As indicated in FIGS. 1 and 2, a motion sensor 26 is included in the laser scanner ssembly, and may be positioned inside the housing. For example, it may be located in the base of the handle portion as indicated, or any suitable location where adequate space can be found without significantly affecting the overall dimensions of the scanner device 10.

FIG. 3 shows schematically an example of a circuit 30 which may be employed in the invention. In the embodiment shown, the trigger spring switch 24 leads to a control 32 which is connected to a power supply 34. The control 32 controls a scan drive 36 and a laser drive 38, as well as signal processing circuitry and indicator lights typically present on a bar code scanner.

The motion sense circuitry 40 is connected to the laser drive 38 through an AND gate 42 which also receives a signal from the main device control 32 as indicated in FIG. 3. The motion sense circuitry 40 is connected to the motion sensor switch 26 (shown in FIGS. 1 and 2), so that the laser drive 38 will be disabled unless the AND gate 42 receives both a command to scan from the control 32 and an okay to scan from the motion sense circuitry 40.

In this way, the laser drive 38 is powered only when the scanner housing 20 (FIG. 1) has just moved, i.e. has moved within a predetermined time period. Two conditions are required, the operator actuated switch 24 must be depressed by the operator, and the motion sensor 26 and associated motion sense circuitry 40 must confirm that the bar code reader device has just been in motion.

The motion detector may comprise a mercury switch which either sends a steady signal (i.e. steadily closed or open circuit) or an erratic signal, signifying motion. These are appropriately interpreted and processed by the motion sense circuitry 40. In one preferred embodiment the motion sensor may be one marketed by Signal Systems International of Holmdel, N.J., under the designation JS101.

Within the motion sense circuitry 40 there is included some form of timer. Thus, if the motion detector indicates that there has been no motion of the housing 20 of the scanner for a predetermined period of time, as determined by the timer, the sense circuitry interprets this as the bar code reader being stationary for the preselected period, and it will send a "not okay" signal to the AND gate 42 to disable the laser drive 38, regardless of whether the trigger spring switch 24 is depressed or not.

The motion sense function can be accomplished, for example, in combinational logic, a microprocessor, or analog timer techniques well known to those skilled in the art.

Also, the laser device 10 can include two or more motion detectors 26, at different orientations in the housing 20, to assure sensitivity to motion in different directions or on different axes and over a broad range of motion frequencies. FIG. 3 shows two motion detectors 26 and 26a, both connected to the motion sense circuitry 40. The different detectors can have different preselected time periods established by the motion sense circuitry 40, in the event that different types of motion are of greater concern than others for the safety of the device. It may be desirable to give different weighting to different axes or directions of motion, or to different frequencies of motion.

It should be understood that other suitable motion detectors, circuitry and logic can be employed while still embodying the principles of the present invention.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A safety shutoff device for a hand held laser beam projecting device which includes a laser drive, a housing, a power supply and a trigger switch, for preventing operation of the laser device in a stationary position for a long enough time to cause damage to the human eye, comprising, motion detector means attached to the housing for sensing motion of said housing and producing a signal indicating motion, motion sense circuit means connected to the motion detector means for disabling the laser drive except when the laser device has just undergone motion within a preselected period of time.

2. The safety shutoff apparatus defined in claim 1, wherein the motion detector means comprises an intermittent switch device for producing a first signal when the laser device has been stationary for said preselected period, and a second signal when the laser device is in motion or has just undergone motion.

3. The safety shutoff apparatus defined in claim 1, wherein the motion detector means comprises means for detecting motion in different directions and along different axes.

4. The safety shutoff apparatus defined in claim 3, wherein the motion detector means includes a plurality of motion switches connected to said motion sense circuit means, each motion switch being in a different orientation in the housing.

5. The safety shutoff apparatus defined in claim 4, wherein the motion sense circuit means provides a different preselected time period for each motion switch.

* * * * *